Sept. 14, 1954   H. G. HAAS   2,689,327
DYNAMOELECTRIC MACHINE
Original Filed Dec. 21, 1945   2 Sheets-Sheet 1
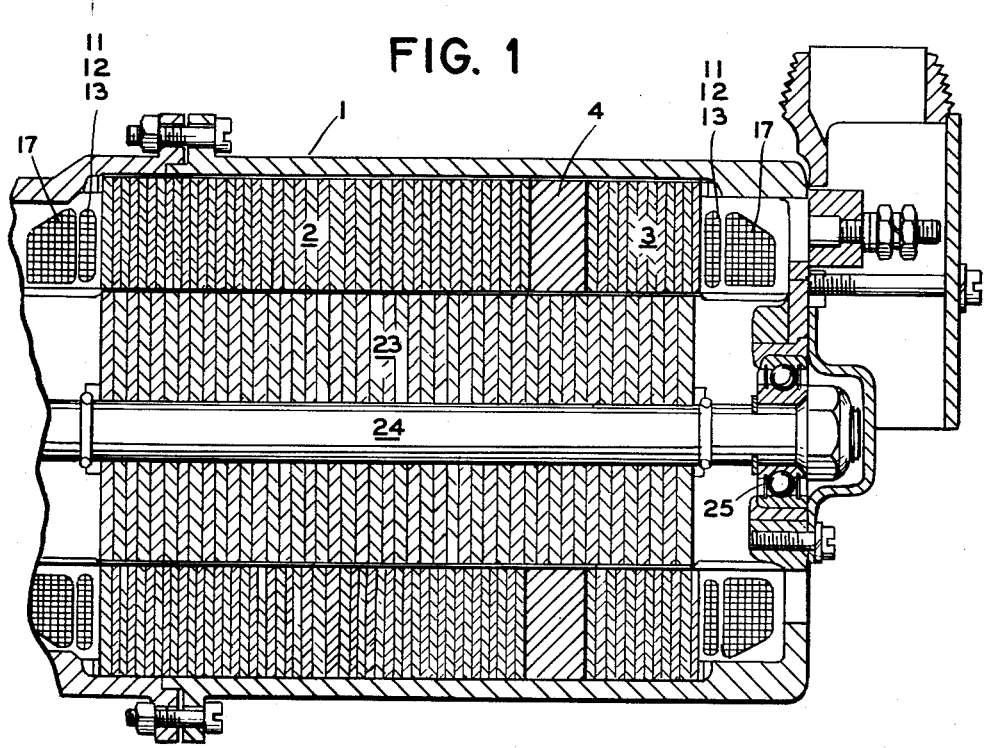
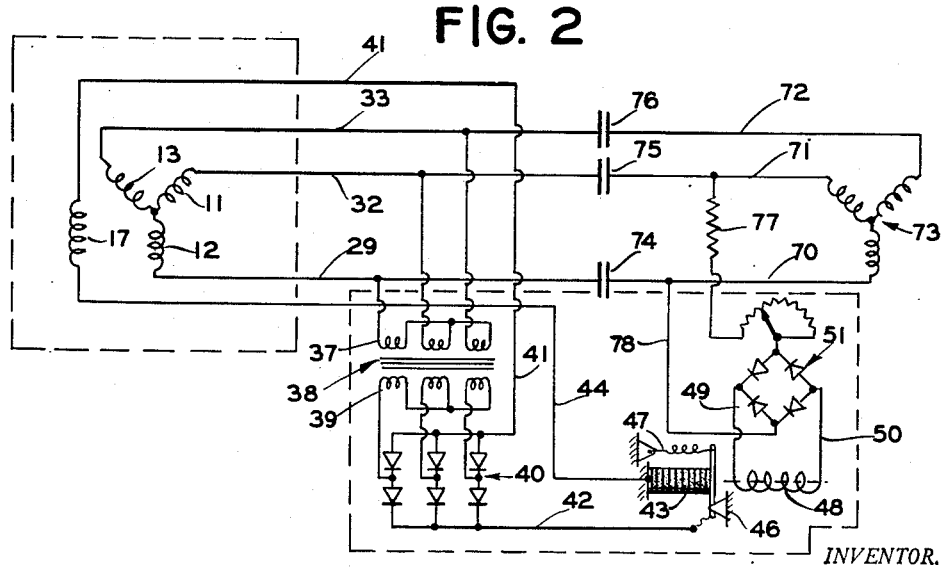
INVENTOR.
HAROLD G. HAAS
BY
*James M. Lickels*
ATTORNEY Sept. 14, 1954  H. G. HAAS  2,689,327
DYNAMOELECTRIC MACHINE
Original Filed Dec. 21, 1945  2 Sheets-Sheet 2

INVENTOR.
HAROLD G. HAAS
BY *James M. Nichols*
ATTORNEY

Patented Sept. 14, 1954

2,689,327

UNITED STATES PATENT OFFICE 2,689,327

DYNAMOELECTRIC MACHINE

Harold G. Haas, Belleville, N. J., assignor to Bendix Aviation Corporation, Teterboro, N. J., a corporation of Delaware Original application December 21, 1945, Serial No. 636,451. Divided and this application May 31, 1950, Serial No. 165,151

3 Claims. (Cl. 322—28)

This application is a division of application Serial No. 636,451, now U. S. Patent No. 2,540,202, and relates to generators and more particularly to control systems and apparatus for the self-excitation of an alternator.

An object of the invention is to provide an alternator having rotor and stator members and one of the said members having two sections of windings, one section to carry the load required and the other section to provide excitation of the alternator field.

Another object of the invention is to provide an alternator having a stator with a portion thereof made of a permanent magnet steel and a rotor cooperating therewith so as to effect an initial magnetic flux for inducing a current in the field winding of the alternator.

Another object of the invention is to provide a system in which the output from the exciter stator windings is applied through a three-phase rectifier to the exciting field of the alternator.

Another object of the invention is to provide a self-excited alternator in which the main output has a three phase step-down transformer connected therefrom. The secondary of the transformer is connected through a three phase rectifier in parallel with the exciter circuit and to the exciting field of the alternator and the output of the last mentioned rectifier being so regulated as to maintain a predetermined output voltage at the main output lines.

Another object of the invention is to provide a novel alternator arranged so as to effect self-excitation without exciter windings, armature windings, commutator or brushes and with a minimum of moving parts.

Another object of the invention is to provide a three phase alternator having a main section formed of a ferro-magnetic material, an auxiliary section formed of a permanent magnet, a spacer formed of a non-magnetic material separating the main section from the auxiliary section so as to prevent the leakage of magnetic flux from the auxiliary to the main section and a rotor formed of a ferro-magnetic material having teeth arranged so as to effect a pulsating flow of magnetic flux between opposite poles of the auxiliary section so as to generate a current in three phase windings about the stator and initiate an exciting current for the alternator field winding.

Another object of the invention is to provide series capacitors connected in the three phase output lines of the alternator to counteract the demagnetizing effect of an inductive load on the stator winding of the alternator. The latter capacitors are so arranged as to introduce a leading current vector which is in phase with the flux or magnetizing vector and out of phase with the demagnetizing current vector resulting from the load so as to counteract the latter demagnetizing effect of the load on the stator windings of the alternator.

Another object of the invention is to provide a form of control system for a self-excited alternator, including a relay operated by the output of the exciter windings so as to close a circuit of a control coil for a carbon pile voltage regulator and connect the exciting field of the alternator to the output of the alternator. The relay is arranged so as to open the circuit to the regulator and the exciting field from the output of the alternator at low rotor speeds so as to thereby prevent loss of current from a battery in the output circuit.

These and other objects and features of the invention are pointed out in the following description in terms of the embodiments thereof which are shown in the accompanying drawings.

In the drawings:

Figure 1 is a longitudinal sectional view of one form of alternator constructed in accordance with the present invention.

Figure 2 is a diagrammatic view illustrating a control circuit for the device shown in Figure 1.

Figure 3:
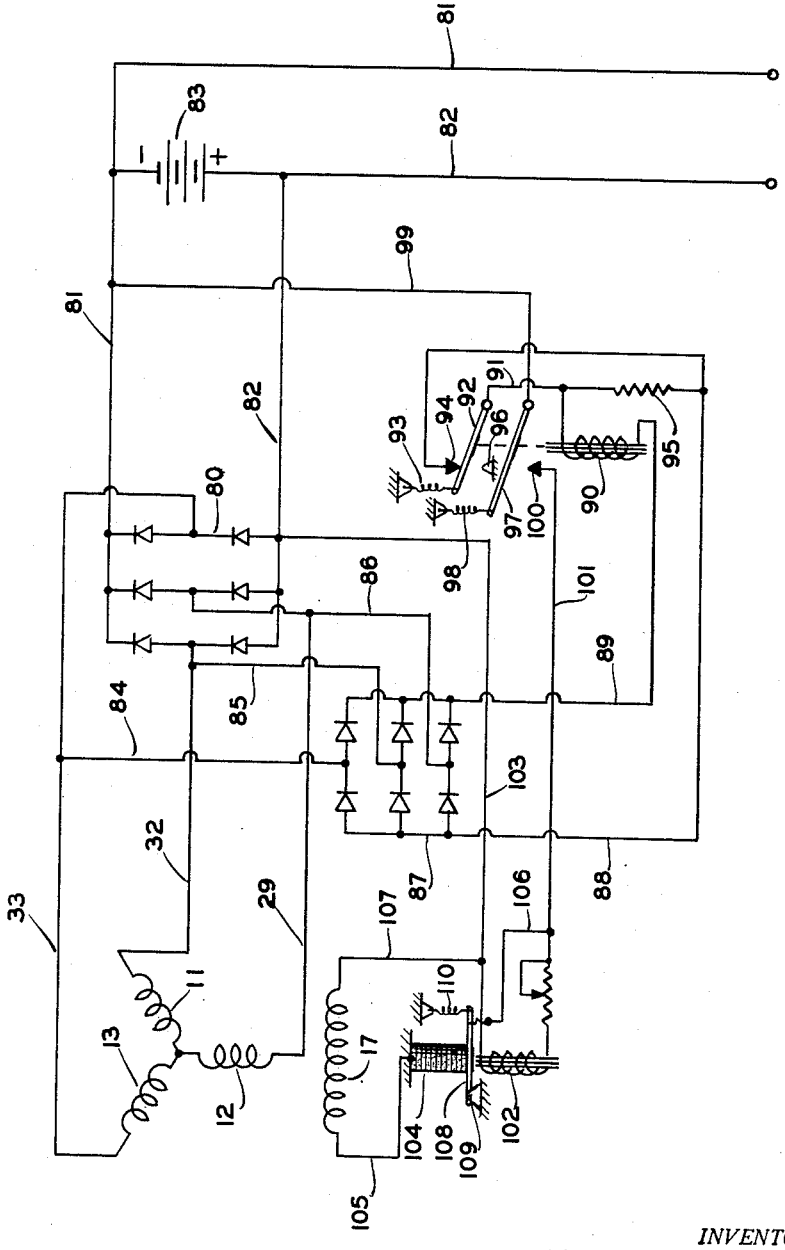
Figure 3 is a diagrammatic view illustrating a modified form of control circuit for the device of Figure 1.

Referring to the form of the invention shown in Figure 1, there is depicted a dynamoelectric machine having an outer casing 1 in which is mounted a stator including a main section 2, and an auxiliary section 3.

The main stator section 2 is preferably formed of a series of laminations or punchings made of a ferro-magnetic material while the auxiliary stator section 3 is preferably formed of laminations of punchings of a permanent magnet steel.

The main stator section 2 and the auxiliary stator section 3 are separated by a non-magnetic spacer or ring made of a suitable material such as aluminum and indicated by the numeral 4. The stator assembly may be fastened together by cement or other suitable means. The purpose of the spacer 4 is to prevent magnetic flux from leaking from the auxiliary permanent magnetic section through the main section.

A field coil 17 is wound around both the main and auxiliary stators 2 and 3. The field coils 17 are each wound with the same polarity and are connected in series.

Mounted within the main and auxiliary stator sections 2 and 3 is a rotor 23 formed preferably of laminations or stampings of ferro-magnetic material as illustrated in the parent application Serial No. 636,451 and affixed to a drive shaft 24 supported at opposite ends by suitable anti-friction bearings, one of which is indicated herein at one end of the shaft 24 by the numeral 25. The opposite end of the shaft 24 may be driven by an engine or other power means through a suitable constant speed drive which may be of a type such as described and claimed in the U. S. Patent No. 2,033,835 granted March 10, 1936, in the name of Raymond P. Lansing.

The rotor 23 is formed with a plurality of teeth, as illustrated in the parent application Serial No. 636,451, and so arranged that upon rotation of the shaft 24 the rotor teeth successively make and break a magnetic circuit through adjoining sections of the auxiliary stator section and adjoining sections of the main stator section.

The stator assemblage and rotor construction is essentially the same as that described and claimed in the parent application Serial No. 636,451. Windings 11, 12 and 13 shown diagrammatically surround not only the main stator section 2 but also pass about the permanent magnet auxiliary stator section 3. A spacer 4 formed of a nonmagnetic material may be positioned in the space between the permanent magnet auxiliary stator section 3 and the main stator section 2 to prevent the leakage of magnetic flux from the auxiliary section 3 to the main section 2.

A control circuit for the form of the invention is shown in Figure 2 in which corresponding numerals indicate corresponding parts to those shown in Figure 1.

In the operation of the form of the invention shown in Figures 1 and 2 rotation of the rotor 23 causes the permanent magnet auxiliary stator 3 to induce an initial voltage directly into the main windings 11, 12 and 13 which through a transformer 38 rectifier 40 combination is fed back to the field winding 17. Then as the voltage at output lines 29, 32 and 33 starts to build up due to the additional magnetic flux set up in the main stator 2 the transformer 38 and rectifier 40 combination of Figure 2 feeds additional rectified A. C. power to the exciting field 17.

Connected in series between the output lines 29, 33 and 32 and input lines 70, 71 and 72 of an inductance load indicated generally by the numeral 73 are capacitors 74, 75 and 76, respectively.

When an inductive load is applied to the output of the alternator the alternating current from the main alternator windings sets up in the inductive load a self-induced counterelectromotive force which tends to oppose the applied electromotive force of the alternator and the electromagnetic force of the field winding 17 and the permanent magnet auxiliary stator section 3 so as to tend to demagnetize the alternator. In order to overcome the latter effect the series capacitors 74, 75 and 76 are inserted in the alternator output so as to provide capacitive reactance for counteracting the effects of the inductive reactance on the alternator.

Thus, the capacitors 74, 75 and 76 counteract the demagnetizing effect on the alternator of the inductive load which would otherwise tend to cause the alternator to lose its excitation. The value of the capacitors selected will assure any desired amount of excitation and if desired may be varied with the inductive load to assure the proper balance between inductive and capacitive reactance.

Lines 77 and 78 are connected across the input lines 70 and 71 of the inductive load 73 and lead to the input of rectifier 51. Output lines 49 and 50 lead from the rectifier 51 to the control coil 48. The control coil 48 regulates the carbon pile 43 connected in circuit with the field 17 so as to maintain a predetermined output voltage from the alternator across the lines 70—71 in a manner previously described.

A third control circuit for the alternator of Figure 1 is shown diagrammatically in Figure 3 and corresponding numerals indicate corresponding parts.

In the latter control circuit of Figure 3 the alternator output lines 29, 32 and 33 are connected to the input of a three way rectifier 80 having direct current output lines 81 and 82 across which may be connected a battery 83 to be charged from the latter supply of direct current.

Lines 84, 85 and 86 lead from the alternator output lines 29, 32 and 33 to the input of a second three phase rectifier 87 having direct current output lines 88 and 89.

The line 88 is connected to one end of an electromagnetic winding 90, while the opposite end of the winding 90 is connected by conductor 91 to a relay switch arm 92 controlled by the electromagnetic winding 90. The relay switch arm 92 is biased under tension of a spring 93 into a position closing a contact 94 to which there is connected the output line 88 of the rectifier 87. A resistor 95 is connected across the switch 92 and a stop 96 limits the movement of the switch arm 92 in a switch opening direction under force of the electromagnetic winding 90.

A second relay switch arm 97 is also controlled by the electromagnetic winding 90 and is biased under tension of a spring 98 in an open circuit position.

The switch arm 97 is connected through a conductor 99 to the direct current output line 81 of the rectifier 80. The latter switch arm 97 cooperates with a switch contact 100 and is arranged to close the same under the magnetic force of the electromagnetic winding 90.

A conductor 101 leads from the contact 100 to one end of an electromagnetic winding 102. The opposite end of the winding 102 is connected through a conductor 103 to the output line 82. The electromagnetic winding 102 is arranged to regulate a variable resistance carbon pile 104 connected at one end by a conductor 105 to the field winding 17 and at the opposite end by a conductor 106 to the conductor 101. The field winding 17 is connected at the other end to the conductor 103 by a conductor 107.

The resistance of the carbon pile 104 is controlled by an armature 108 pivoted at 109 and exerting a compressive force upon the carbon pile 104 under the tension of a spring 110. The electromagnetic winding 102 is arranged to adjust the armature 108 against the biasing force of the spring 110. The spring 110 is arranged so as to balance the pull on armature 108 by the electromagnetic winding 102 when the winding 102 is energized by a voltage having a predetermined value.

In the operation of the control system of Figure 3 it will be seen that upon initial operation of the alternator the respective relay switch arms 92 and 97 will be in the position shown and upon rotation of the rotor 23 of the alternator shown in Figure 1, the permanent magnets 3 will cause the induction into the main windings 11, 12 and 13 of a three phase alternating current. Upon the latter exciting voltage reaching a predetermined value the voltage across the electromagnetic winding 90 will cause the relay switch arm 92 to open contact 94 and switch arm 97 to close contact 100. The opening of the contact 94 which is normally closed inserts the resistor 95 in series with the electromagnetic winding 90 so as to limit the energizing current to a safe value for continuous duty operation.

The closing of the contact 100 by the switch arm 97 closes the energizing circuit for the control winding 102 and the energizing circuit for the field winding 17.

The latter action connects the battery 83 and the direct current output of the rectifier 80 to the exciting field 17 of the alternator through carbon pile 104.

The control winding 102 maintains the charging voltage of the battery 83 at a predetermined value by controlling the resistance of the carbon pile and thereby the excitation of the field winding 17 in response to the charging voltage across the output lines 81 and 82.

At a predetermined minimum alternator speed the voltage across the lines 88 and 89 decreases to a predetermined low value permitting the switch arm 97 to open contact 100 and thereby disconnect the control winding 102 and field winding 17 from the lines 81 and 82 so as to prevent the battery from loss of energy through the field winding 17 and control winding 102.

From the foregoing, it will be seen that there is provided a novel self-excited alternator and control system therefor in which no exciter windings, armature windings, commutator or brushes are required to effect its operation and an alternator having a minimum number of moving parts.

Although only two embodiments of the invention have been illustrated and described, various changes in the form and relative arrangements of the parts may be made to suit requirements.

What is claimed is:

1. An induction type alternator comprising a main winding, a field winding, a first permanent magnet member, a second member to complete a magnetic circuit for said first member, one of said members being movable relative to the other for making and breaking said magnetic circuit for effecting excitation of said main winding, output lines from said main winding and connecting the same to an inductive load, means for energizing said field winding from said output lines, and capacitor means in the output lines of the main winding to counteract a demagnetizing effect of the inductive load on the alternator.

2. An induction type alternator comprising a main winding, a field winding, a first permanent magnet member, a second member to complete a magnetic circuit for said first member, one of said members being movable relative to the other for making and breaking said magnetic circuit for effecting initial excitation of said main winding, output lines from said main winding and connecting the same to an inductive load, capacitors connected between said main winding and load, and means connecting said field winding across the output lines of said main winding and between said main winding and capacitors so as to effect initial excitation of said field winding upon rotation of said one member.

3. An induction type alternator comprising a main winding, a field winding, a first permanent magnet member, a second member to complete a magnetic circuit for said first member, one of said members being movable relative to the other for making and breaking said magnetic circuit for effecting excitation of said main winding, output lines from said main winding and connecting the same to an inductive load, capacitors connected between said main winding and load, means connecting said field winding across the output lines of said main winding and between said main winding and capacitors so as to effect initial excitation of said field winding upon rotation of said one member, and means for regulating the excitation of said field winding responsive to the voltage across said inductive load.

References Cited in the file of this patent

UNITED STATES PATENTS

| Number | Name | Date |
| --- | --- | --- |
| 1,953,141 | Wagner | Apr. 3, 1934 |
| 2,108,662 | Fisher | Feb. 15, 1938 |
| 2,208,416 | Friedlander et al. | July 16, 1940 |
| 2,307,736 | Parker et al. | Jan. 5, 1943 |
| 2,460,095 | Love | Jan. 25, 1949 |